June 24, 1969   G. H. GOODE   3,451,292

SAW BLADE CLAMP

Filed Dec. 23, 1966

INVENTOR.
GEORGE H. GOODE,
BY
Berman, Davidson & Berman
ATTORNEYS.

United States Patent Office 3,451,292
Patented June 24, 1969

3,451,292
SAW BLADE CLAMP
George H. Goode, 1524 Crestwood Blvd.,
Lake Worth, Fla. 33460
Filed Dec. 23, 1966, Ser. No. 604,237
Int. Cl. B23d 63/12
U.S. Cl. 76—78                                6 Claims

ABSTRACT OF THE DISCLOSURE

A clamping vise for clamping and holding a handsaw blade in position to be sharpened, the vise having a main supporting bracket portion provided with a screw clamp engageable with the edge of a workbench or table and having a clamping arm pivotally-engageable on the main bracket and secured thereto by a bolt and nut, the main bracket and the clamping arm having opposing clamping shoe elements between which a saw blade may be clampingly-received.

---

This invention relates to improvements in saw filing fixtures, and more particularly, to a clamping vise for clamping and holding a handsaw while sharpening the blade thereof.

A main object of the invention is to provide an improved support means for clampingly-supporting a handsaw blade in proper position for sharpening, the support means being very simple in construction, being arranged so that it may be quickly and easily mounted on a bench or supporting table, and being arranged so that it securely and firmly supports the blade of a handsaw without interfering in any way with the sharpening actions performed on the teeth of the blade.

A further object of the invention is to provide an improved clamping means for holding a handsaw blade in a readily accesible upright position so that it can be efficiently and easily sharpened, the clamping means involving very inexpensive parts, being durable in construction, providing reliable and rigid support of the saw blade in proper position for sharpening, and being relatively compact in size.

A still further object of the invention is to provide an improved device for supporting either a circular saw blade or a handsaw blade in an upright position relative to a worktable or similar fixed support, the supporting device being provided with means to be readily and easily clampingly-attached to a work table or similar support, the device being arranged so that it can clampingly-engage the proper portions of the blade being sharpened so that the blade is held securely and cannot vibrate during the sharpening of its teeth, the clamping means employed being such that it can be readily loosened and re-tightened to allow for adjustment of the blade so as to permit convenient access to successive teeth thereof for sharpening, and the clamping means being further arranged so that it does not mar nor scratch the surface of the blade while clamping same and supporting same during the sharpening process thereof.

Further objects and advantages of the invention will become apparent from the following description and claims, and from the accompanying drawing, wherein:

Figure 1:
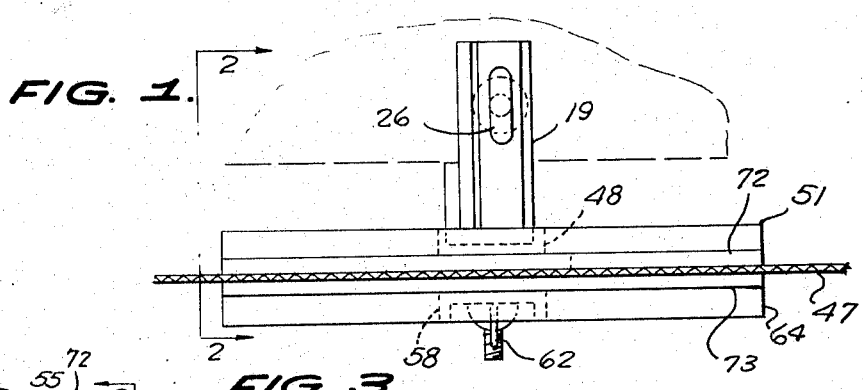
FIGURE 1 is a top plan view of an improved saw filing fixture constructed in accordance with the present invention, illustrated with a portion of a handsaw blade clamped therein for sharpening.

Referring to the drawing, 11 generally designates a sawblade-supporting fixture constructed in accordance with the present invention. The fixture 11 comprises a vertical post element 12 which may be in the form of an angle bar of steel or other suitable rigid material having the respective flanges 13 and 14 at right angles to each other. Rigidly-secured to the lower end portion of the vertically-extending flange 14 is a relatively short horizontally-extending bottom clamp bar 15 likewise in the form of an angle bar, having the depending flange 16 and the horizontal flange 17, the forward end portion of the depending flange 16 being secured to the lower end portion of flange 14 of the upright bar 12 in any suitable manner, as by welding, or the like, and being likewise rigidly-secured at its abutting end edge portion to the front flange 13 of the post element 12.

Similarly secured to bar 12 is a second horizontal angle bar 19, said angle bar 19 having a vertical flange 20 and the horizontal flange 21, the vertical flange 20 being rigidly-secured to the flange 14 of vertical bar 12 and to the flange 13 of said vertical bar in the same manner as the lower angle bar 15. As shown, flange 20 is directed upwardly, whereas the flange 16 of the lower bar 15 is directed downwardly. The horizontal flange 21 of bar 19 is spaced from the horizontal flange 17 of the lower angle bar and extends parallel thereto. The spacing between the opposing flanges 21 and 17 is sufficient to receive the margin of a work table top board 23 therebetween or to receive any other suitable stationary support of substantial thickness. In a typical arrangement, such as that shown in FIGURES 1, 2 and 3, the margin of a workbench 23 is received between the horizontal flanges 17 and 21 with the lower flange 17 in abutment with the bottom surface of the work table top board 23.

Welded on the flange 21 of upper bar 19 is a longitudinally-extending reinforcing block 44, and threadedly-engaged through block 44 and the subjacent flange 21 is a clamping screw 24 provided with a pivoted bottom clamping foot 25 and a circular top gripping eye member 26. When the screw 24 is manually-tightened by means of the top gripping eye 26, the foot 25 is forced into clamping engagement with the top surface of the work table top board 23 as shown in FIGURE 2.

The top portion of flange 13 is formed with a pair of vertically-spaced keyhole-shaped apertures 45 and 46, the upper aperture 45 being employed to receive a circular saw blade clamping bolt 28 for supporting a circular saw blade 32 in position for sharpening, in conjunction with a pair of plywood discs 27 and 34 in the manner disclosed in my co-pending application Ser. No. 552,945, filed Jan. 25, 1966, and entitled "Power Saw Blade Clamp." Thus, a typical circular saw blade 32 may be supported on the fixture by mounting it on the bolt 28, the bolt passing through the central aperture of the blade, the bolt being supported in the reduced lower portion of the keyhole-shaped aperture 45, a first plywood disc 27 being interposed between the blade 32 and the flange 13, and a second plywood disc 34 being disposed on the outside portion of the bolt 28, and being clamped against the blade 32 by a suitable wing nut.

The fixture 11 is adapted to support a handsaw blade 47 for sharpening in a similar manner, employing the lower keyhole-shaped aperture 46 instead of the upper aperture 45. Thus, the fixture comprises an inwardly-facing channel bar 48 nestingly-receiving the front flange 13 of the vertical post member 12 and being secured thereto by a fastening bolt 49 extending through the aperture 46 and the web of the channel bar 48 and being threadedly-engaged centrally in a large circular disc member 50 which thus serves as a clamping nut. The screw member 49 is relatively short so that it does not project forwardly beyond the front plane of the large washer-nut element 50.

Figures 2, 3:
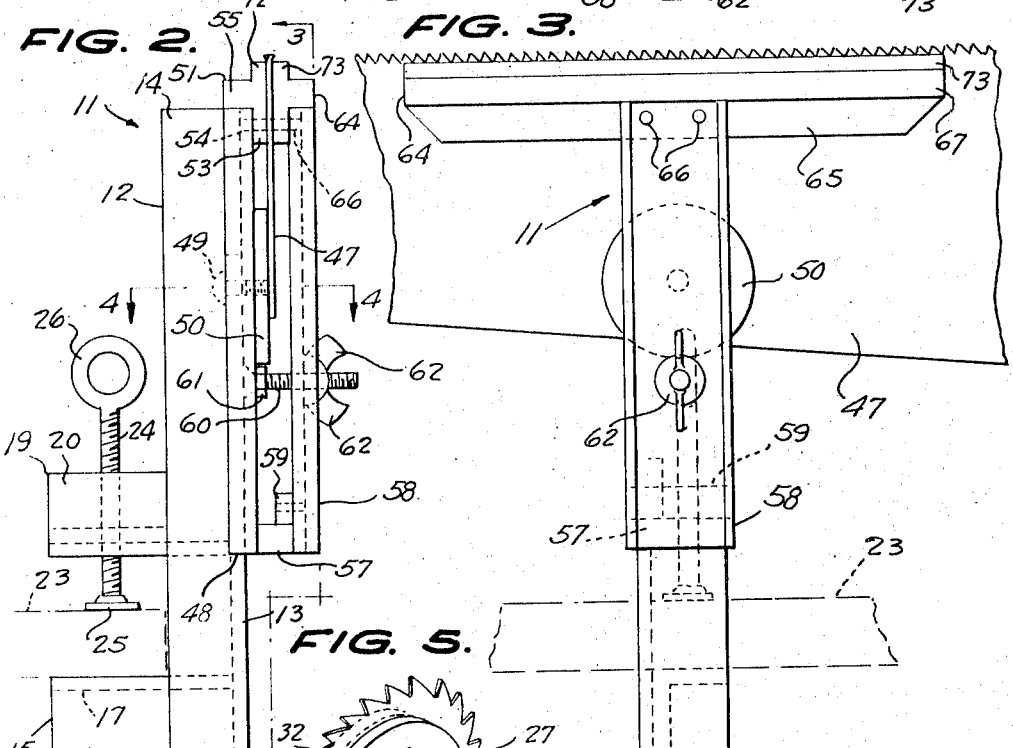
FIGURE 2 is an end elevational view of the fixture shown in FIGURE 1, taken substantially on the line 2—2 of FIGURE 1.
FIGURE 3 is a front elevational view of the fixture of FIGURES 1 and 2, taken substantially on the line 3—3 of FIGURE 2.

Rigidly-secured to the top end of the channel bar 48 is a horizontally-extending clamping shoe member 51, said shoe member being generally T-shaped in cross-section, as shown in FIGURE 2, and having a depending flange 53 which is rigidly-fastened at its intermediate portion to the top end portion of bar 48, as by a pair of rivets 54, 54. The stem portion 55 of the shoe member 51 rests on and abuts the top edge of bar 48, so that a rigid connection is provided between the horizontal T-shaped shoe 51 and the vertical channel bar 48. The head portion of the T-shaped bar 55, including the flange 53, is substantially the same thickness as the circular washer member 50 and cooperates therewith in providing bearing support for a saw blade 47 clamped in the fixture, as will be presently described.

Rigidly-secured transversely to the bottom end portion of channel bar 48 is a horizontal block element 57. Designated at 58 is a channel-shaped vertical clamping bar arranged with its flanges directed outwardly and provided with a transversely-disposed fulcrum block 59 rigidly-secured to its web portion substantially the same distance above its bottom end as the thickness of the block 57, whereby the arm 58 may be pivotally-supported on the block 57 with the forward portion of block 57 engaged in the corner between the fulcrum block 59 and the adjacent portion of the web of bar 58. This is clearly illustrated in FIGURE 2.

A clamping bolt 60 is engaged through the web of the inner channel bar 48 subjacent the washer member 50, said bolt being secured to the web of channel bar 48 by a fastening nut 61. Bolt 60 extends through an aperture provided in the web of the outer channel bar 58 and is provided with a wing nut 62 threadedly-engaged thereon, as shown in FIGURES 1, 2, 3 and 4.

Rigidly-secured to the top end of the outer channel bar 58 is another horizontally-extending, generally T-shaped shoe bar 64 which is in registry with and opposes the inner shoe bar 51, the outer shoe bar 64 having a depending web 65 to the intermediate portion of which the top end of outer channel bar 58 is rigidly-secured, as by a pair of rivets 66, 66. The stem portion 67 of shoe bar 64 is supported on and abuts the top edge of channel bar 58, whereby a completely rigid connection is provided between shoe bar 64 and bar 58.

The inside confronting surfaces of the clamping shoe bars 51 and 64 are smoothly polished so that they will nor mar nor scratch the surfaces of a saw blade 47 clamped therebetween.

Figures 5, 6:
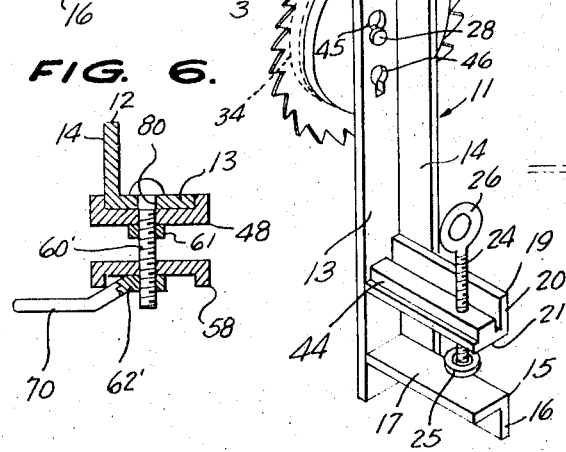
FIGURE 5 is a perspective view showing the fixture employed to clampingly-support a circular saw blade for sharpening.
FIGURE 6 is a cross-sectional view similar to the lower portion of FIGURE 4, but showing a modified form of clamping nut.
Figure 4:
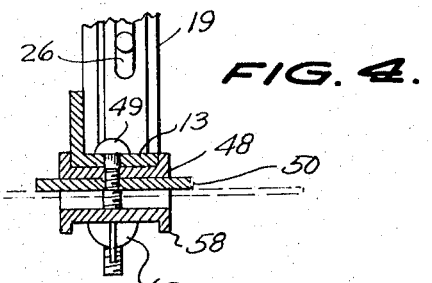
FIGURE 4 is a fragmentary horizontal cross-sectional view taken substantially on the line 4—4 of FIGURE 2.

If so desired, a nut member 62' having an outwardly-extending actuating arm 70 may be employed on the clamping bolt, as shown at 60' in FIGURE 6, in place of the wing nut 62, to provide increased leverage for tightening the clamping device. In using the device, the saw blade 47 is mounted between the clamping shoes 51 and 64 in the manner illustrated, with the saw teeth elevated slightly above the top surfaces of the upwardly-directed flange portions, shown at 72 and 73, of the clamping shoes. The lower portion of the blade 47 rests against the large circular washer member 50 so that the blade is adequately supported against vibration and can thereby be quickly and efficiently sharpened by a file or similar sharpening tool. As will be readily apparent, by manipulating the wing nut 62 or the clamping nut 62', the device can be easily loosened and retightened to enable the blade 47 to be advanced along the clamp device so that the teeth thereof may be successively sharpened.

As will be readily apparent, the fixture may be readily converted to support either a circular saw blade 32, as above-described, or a handsaw blade 47, as required.

It will be noted that in the arrangement illustrated in FIGURES 1 to 4, the connecting bolt 60 has a conical head which is received in a conical recess provided in the web of the inner channel bar 48, the fastening screw 60 being rigidly-clamped to channel bar 48 by the fastening nut 61. The conical head of the screw is thus flush with the web of bar 48. The screw 60 is thus connected to the web 48 and no aperture is required therefor in the flange 13 of the vertical post member 12. In the alternative arrangement shown in FIGURE 6, the connecting screw 60' engages through an aperture 80 provided therefor in the flange 13 of the vertical post member 12 and the connecting bolt 60' serves to clampingly-secure channel bar 48 to flange 13 by means of the clamping nut 61.

While certain specific embodiments of an improved saw blade-clamping support for supporting a handsaw for sharpening have been disclosed in the foregoing description, it will be understood that various modifications within the spirit of the invention may occur to those skilled in the art. Therefore, it is intended that no limitatoins be placed on the invention except as defined by the scope of the appended claims.

What is claimed is:

1. A saw blade-clamping support comprising vertical post means, spaced parallel horizontal bar means at the lower portion of the vertical post means in perpendicular relation to said vertical post means, clamping screw means threadedly-engaged through one of the horizontal bar means and extending toward the other horizontal bar means for clampingly-engaging a stationary support received between the horizontal bar means and for supporting the vertical post means in an upright position, an inwardly-facing channel-shaped vertical bar nestingly-receiving said vertical post means, means clampingly-connecting said vertical post means and channel-shaped vertical bar, a first horizontal shoe bar rigidly-secured to the top end of said channel-shaped vertical bar, an outwardly-facing second channel-shaped bar, cooperating pivot support means on the lower end portions of the channel-shaped bars, means to clamp the intermediate portions of the channel-shaped bars together, and a second horizontal shoe bar rigidly-secured to the top end of the second channel-shaped bar opposing and substantially in registry with said first horizontal shoe bar, said shoe bars having confronting opposing vertical clamping surfaces adapted to clamp a saw blade therebetween.

2. The saw blade-clamping support of claim 1, and wherein said cooperating pivot support means comprises interengaging transverse abutment blocks on the lower portions of the channel-shaped bars.

3. The saw blade-clamping support of claim 2, and wherein said abutment blocks comprise a first transverse abutment block secured to the lower end portion of one of the channel-shaped bars and a second transverse abutment block secured to the other channel-shaped bar and spaced above its lower end by a sufficient distance to provide a recess to receive the first abutment block.

4. The saw blade-clamping support of claim 3, and wherein the first transverse abutment block is secured to the first channel-shaped bar and the second transverse abutment block is secured to the second channel-shaped bar.

5. The saw blade-clamping support of claim 4, and wherein the means clampingly-connecting the vertical post means and the channel-shaped vertical bar comprises a threaded bolt extending through the vertical post means and the channel-shaped vertical bar and a relatively large flat clamping washer member threadedly-engaged on the bolt.

6. The saw blade-clamping support of claim 5, and wherein the outer vertical surface of the clamping washer member is substantially coplanar with the vertical clamping surface of the first horizontal shoe bar.

References Cited
UNITED STATES PATENTS 2,434,568  1/1948  Johnson _____ 76—78
2,713,275  7/1955  Gregston _____ 76—78

BERNARD STICKNEY, *Primary Examiner.*